Patented Sept. 26, 1950

2,523,528

UNITED STATES PATENT OFFICE 2,523,528

N'(4-HYDROXY-4-ISOIMIDAZOL-2-YL)SULFONAMIDES AND THEIR PRODUCTION

Jonathan W. Williams, Claymont, and Thurmond A. Williamson, Arden, Del., assignors to E. I. du Pont de Nemours & Company, Wilmington, Del., a corporation of Delaware No Drawing. Application April 8, 1949, Serial No. 86,408

2 Claims. (Cl. 260—239.9)

This invention relates to N'(hydroxy-4-isoimidazol-2-yl)sulfanilamides and their alkali metal salts and to methods for their preparation.

The N'(4-hydroxy-4-isoimidazol-2-yl)sulfanilamides of the invention are represented by the formula

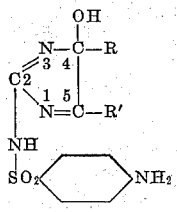

where R and R' are hydrogen or alkyl.

As will be seen from the above formula, the compounds are particularly characterized by the presence of a hydroxyl group attached to the heterocyclic ring at the four-position. This characteristic makes the compounds valuable as intermediates for the preparation of a wide variety of derivatives by substitution at the point of the hydroxyl group; for example, the hydroxyl group in the heterocyclic ring lends the compounds to substitution at that point by halogen, alkoxy, or other groups. Also the alkali metal salts such as the sodium salt or the potassium salt of the N'(4-hydroxy-4-isoimidazol-2-yl)sulfanilamides of the invention are easily formed by substitution of the alkali metal for the N-hydrogen atom on the sulfonamido group; such salts are valuable because of their solubility in water.

The compounds of the invention are prepared by the condensation of an aliphatic alpha-diketone with sulfaguanidine or its monohydrate, or with a benzene sulfonyl guanidine which contains in the para position a substituent capable of being converted into an amino group.

The alpha-diketones used in the preparation of the compounds of the invention are represented by the formula

where R and R' are hydrogen or alkyl; preferably the alkyl is lower alkyl, that is 1 to 5 carbon atoms inclusive. Typical suitable alpha-diketones are glyoxal, pyruvaldehyde, biacetyl, 2,3-pentanedione, 2-methyl-3,4-pentanedione, alpha-oxo-butyraldehyde, alpha-oxo-valeraldehyde, 2,3-hexanedione, 2,2-dimethyl-3,4,-pentanedione, 3,4-hexanedione, 2,5-dimethyl-3,4-hexanedione, 2,2,5-trimethyl-3,4-hexanedione, and 5-methyl-2,3-hexanedione.

The condensation reaction between sulfaguanidine and the alpha-diketone is most readily carried out in the presence of a solvent and is facilitated by the use of a small amount of a condensing agent. Sulfuric acid is a satisfactory condensing agent.

The N'(4-hydroxy-4-isoimidazol-2-yl)sulfanilamides of the invention are fine-crystalline, high-melting, powdered solids, insoluble in the common low molecular weight organic solvents but soluble in aqueous alkali.

The alkali metal salts of the compounds are prepared by heating a suspension of the powdered sulfonamide in a solvent such as methanol in the presence of an excess of an alkali metal alkoxide such as sodium methoxide. The alkali metal salts are solid powders, soluble in water, very slightly soluble in the lower alcohols, and insoluble in the common hydrocarbon solvents.

The compounds of the present invention are particularly valuable as intermediates for the preparation of dyestuffs. They may also be used as insecticides, fungicides, and bactericides and may be useful for therapeutic purposes, and as intermediate products in the manufacture of therapeutically active substances.

The invention will be more readily understood by reference to the following examples which illustrate typical compounds of the invention, methods for their preparation, and their use.

EXAMPLE I

*N'(4-ethyl-4-hydroxy-5-methyl-4-isoimidazol-2-yl)sulfanilamide*

5 parts by weight of 2,3-pentanedione is added to a solution of 10 parts by weight of sulfaguanidine monohydrate in 300 parts by weight of ethanol. 0.1 part by weight of concentrated sulfuric acid is added to the solution and the liquid is heated under reflux for 30 minutes. The mass is then cooled and filtered. There is obtained 13 parts by weight of yellow-colored crystalline N'(4-ethyl-4-hydroxy-5-methyl-4-isoimidazol-2-yl)sulfanilamide, melting at 222–225° C.

A water-insoluble, reddish-orange dyestuff suitable for the coloring of acetate rayon fabrics is obtained from the compound of Example I by first reacting the compound of Example I with sodium nitrite in a cold acidic suspension of the compound to form the diazo salt and then coupling this salt with alpha-naphthol. A deep red-colored, water-soluble, wool dye is obtained by coupling the diazo salt of the compound of Example I with 1-naphthylamine-4-sulfonic acid.

EXAMPLE II

*N'(4,5-dimethyl-4-hydroxy-4-isoimidazol-2-yl) sulfanilamide*

216 parts by weight of sulfaguanidine monohydrate and 80 parts by weight of biacetyl in 600 parts by weight of glacial acetic acid is heated at 90° C. for 30 minutes. The mixture is cooled and filtered to give 208 parts by weight of crystalline N'(4,5 - dimethyl-4-hydroxy-4-isoimidazol-2-yl) sulfanilamide as a pale tan powder melting at 260–265° C.

By diazotizing the compound of Example II and coupling it with alpha-naphthol, a yellow-brown dyestuff is obtained; coupling the diazotized compound with 1-naphthylamine-4-sulfonic acid gives a deep red product.

EXAMPLE III

*N'(4-methyl-4-hydroxy-4-isoimidazol-2-yl) sulfanilamide*

10 parts by weight of sulfaguanidine monohydrate is dissolved in 100 parts by weight of glacial acetic acid and 10 parts by weight of 30.4% aqueous pyruvic aldehyde is added thereto. The mixture is heated at 60° C. for 15 minutes, cooled and filtered. There is obtained 11 parts by weight of a brown crystalline solid melting at 245° C. with gross decomposition.

A yellow, water-insoluble, cellulose acetate dye is obtained by coupling alpha-naphthol with the diazo salt of the compound of Example III.

EXAMPLE IV

*N'-(4-hydroxy-4-isobutyl-5-methyl-4-isoimidazol-2-yl)-sulfanilamide*

A mixture of 10 parts by weight of sulfaguanidine, 6 parts by weight of 5-methyl-2,3-hexanedione, 300 parts by weight of glacial acetic acid and 0.5 part by weight of concentrated sulfuric acid are heated at about 90° C. for one hour. The mixture is cooled and filtered to give 12 parts by weight of N'(4-hydroxy-4-isobutyl-5 - methyl - 4-isoimidazol-2-yl) sulfanilamide, a light tan crystalline solid, M. P. 272–275° C. dec.

Brick red is the color of the dyestuff obtained by diazotizing the compound of Example IV with sodium nitrite and coupling the resulting diazo salt with alpha-naphthol.

EXAMPLE V

*Sodium salt of N'(4,5-dimethyl-4-hydroxy-4-isoimidazol-2-yl) sulfanilamide*

A mixture of 5 parts by weight of N'(4,5-dimethyl - 4 - hydroxy-4-isoimidazol-2-yl) sulfanilamide, 2 parts by weight of sodium methoxide and 100 parts by weight of methanol is heated under reflux for 15 minutes, cooled and filtered. There is obtained 5 parts by weight of the sodium salt of N'(4,5-dimethyl-4-hydroxy-4-isoimidazol-2-yl) sulfanilamide. The product is a pale tan solid which is soluble in water, only very slightly soluble in the lower alcohols such as methanol and ethanol, and insoluble in the common hydrocarbon solvents such as pentane and benzene.

We claim:

1. A compound selected from the group consisting of N'(4-hydroxy-4-isoimidazol-2-yl) sulfanilamides represented by the formula

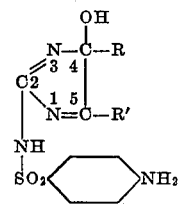

and then alkali metal salts, where R and R' are selected from the class consisting of hydrogen and alkyl.

2. A process for the manufacture of a N'(4-hydroxy - 4-isoimidazol-2-yl) sulfanilamide which comprises heating an alpha-diketone represented by the formula

where R and R' are from the class consisting of hydrogen and alkyl, with sulfaguanidine to effect condensation of the two compounds.

JONATHAN W. WILLIAMS.
THURMOND A. WILLIAMSON.

REFERENCES CITED

The following references are of record in the file of this patent:

UNITED STATES PATENTS

| Number | Name | Date |
| --- | --- | --- |
| 2,357,249 | Anderson | Aug. 29, 1944 |
| 2,435,002 | Hartmann et al. | Jan. 27, 1948 |

FOREIGN PATENTS

| Number | Country | Date |
| --- | --- | --- |
| 521,821 | Great Britain | May 31, 1940 |

OTHER REFERENCES

Ganapathi, Proceedings Indian Academy of Science, vol. 13 (1941), pages 316–389.